United States Patent
Pulijala

(10) Patent No.: US 8,860,378 B2
(45) Date of Patent: Oct. 14, 2014

(54) METHOD AND SYSTEM FOR ATTACHMENT AND REMOVAL INDICATION FOR BATTERY CHARGING DEVICES

(75) Inventor: Srinivas K. Pulijala, Tucson, AZ (US)

(73) Assignee: Standard Microsystems Corporation, Happaugue, NY (US)

( * ) Notice: Subject to any disclaimer, the term of this patent is extended or adjusted under 35 U.S.C. 154(b) by 426 days.

(21) Appl. No.: 13/303,176

(22) Filed: Nov. 23, 2011

(65) Prior Publication Data

US 2013/0127402 A1    May 23, 2013

(51) Int. Cl.
*H01M 10/44* (2006.01)
*H01M 10/46* (2006.01)
*H02J 7/00* (2006.01)

(52) U.S. Cl.
CPC .................... *H02J 7/0009* (2013.01)
USPC .......................................... 320/162

(58) Field of Classification Search
USPC ................. 320/106, 107, 114, 115, 132, 162
See application file for complete search history.

(56) References Cited

U.S. PATENT DOCUMENTS

| 5,568,039 | A | * | 10/1996 | Fernandez | 320/150 |
| 5,606,241 | A | * | 2/1997 | Patino et al. | 320/137 |
| 5,754,027 | A | * | 5/1998 | Oglesbee et al. | 320/122 |
| 6,420,854 | B1 | * | 7/2002 | Hughes et al. | 320/165 |
| 2010/0052623 | A1 | * | 3/2010 | Wang et al. | 320/162 |

* cited by examiner

*Primary Examiner* — Edward Tso
(74) *Attorney, Agent, or Firm* — King & Spalding L.L.P.

(57) ABSTRACT

Embodiments of the present disclosure provide a method and system for indicating an attachment and removal for a portable device. The method includes the steps of attaching the portable device to a charging system, delivering current to the portable device from the charging system, the delivered current is limited based on the portable device, replicating the current flowing through the first switch at a second switch, generating a voltage based on the current flowing through the second switch, comparing the voltage with a pre-defined threshold voltage, and indicating at least one of attachment or removal for the portable device based on the comparison.

20 Claims, 4 Drawing Sheets

METHOD AND SYSTEM FOR ATTACHMENT AND REMOVAL INDICATION FOR BATTERY CHARGING DEVICES

TECHNICAL FIELD

The present disclosure relates to portable devices and more particularly to methods and systems for status.

BACKGROUND

Portable electronic devices such as MP3 players, cameras, and cell phones are typically fitted with a USB port, which allows them to transfer data to or from other controllers or hosts, such as personal computers, notebooks, or televisions. Using these USB ports, battery charging devices or portable devices may charge their batteries by conveniently drawing current from personal computers or other devices. Recently introduced standalone charging devices include a USB port, through which users can charge portable devices.

The advent of dedicated USB chargers has, however, increased charging complexity. Now, different types of USB charging ports are available, such as standard downstream ports, dedicated charging ports, and other such ports. Moreover, these ports allow portable devices to draw charge at different rates. Because these charging ports have different electrical characteristics, portable devices must identify the port type before they can begin drawing current. If the port is not correctly identified or not identified at all, a portable device may not be able to draw sufficient current from the port. Ascertaining the port type, however, can often be difficult.

To overcome this difficulty, the USB Battery Charging Working Group has introduced a Battery Charging Specification (BCS), which describes a charging port detection handshake profile, allowing BCS-compatible devices to detect the USB port type before drawing current. Though this profile allows compatible devices to charge, it introduces a problem for non-BCS compliant legacy devices.

Legacy products do not follow the BCS protocol; therefore, when these devices are connected to USB charger, they may not be able to properly detect the port type. Moreover, because legacy devices cannot identify the port type, they may be allowed to draw only minimal current (80-100 mA) from the charging port or no current at all. Moreover, these products do not provide any way of detecting extremely low current.

Currently, smart charging ports support a large number of portable devices. These ports sometimes provide different handshaking protocols to downstream devices to initiate charging. Once a handshake is complete, the charging port provides current according to the successful handshake protocol's charging parameters. Some challenges exist, however, with this charging scheme. For example, if the portable device identifies the port as a standard downstream port, the handshake would be complete; but, the portable device may not be able to draw any current or may draw minimum current, which is not sufficient to charge the device efficiently. Moreover, when a legacy device cannot determine whether the connected device is drawing optimum amount of current.

Therefore, there remains a long-felt but unresolved need for techniques for detecting and/or indicating attachment and removal for battery charging devices or portable devices with an adjustable threshold.

SUMMARY

Briefly described, and according to one embodiment, the present disclosure describes a system and method for indicating attachment and removal for a portable device. The system includes a charging system having a first switch for connecting the portable device to a power supply. The charging system further includes a second switch connected to the first switch for replicating a current flowing through the first switch. The charging system further includes a resistor connected to the amplifier for generating a voltage based on the current flowing through the second switch. Further, the charging system includes a comparator connected to the resistor for comparing the voltage with a pre-defined threshold voltage. Furthermore, the charging system includes an indicator for indicating at least one of attachment or removal for the portable device based on the comparison.

According to another embodiment, the present disclosure describes a method for indicating attachment and removal for a portable device. The method includes attaching the portable device to a charging system. Further, the method includes delivering current to the portable device through a first switch. The delivered current is limited based on the portable device. The method also includes replicating the current flowing through the first switch at a second switch. Further, the method includes generating a voltage based on the current flowing through the second switch. The method further includes comparing the voltage with a pre-defined threshold voltage. Furthermore the method includes indicating at least one of attachment or removal for the portable device based on the comparison.

Figure 1:
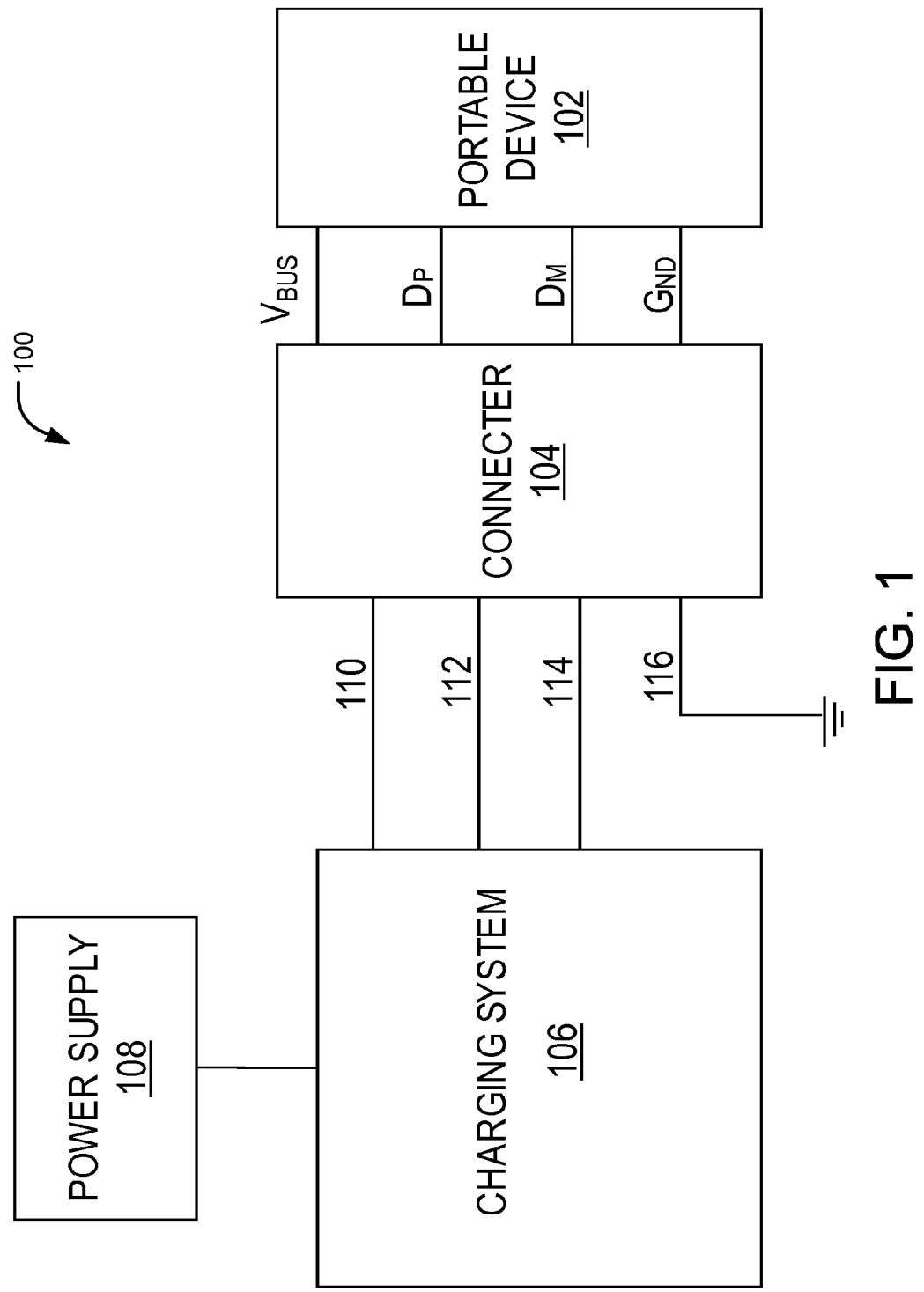
FIG. 1 is a block diagram illustrating an exemplary charging network where various embodiments of the present disclosure may function.

While embodiments of the present disclosure are amendable to various modifications and alternative forms, specific embodiments are shown by way of example in the drawings and are described in detail. It should be understood, however, that the drawings and detailed description thereto are not intended to limit the present disclosure to the particular form disclosed, but on the contrary, the intention is to cover all modifications, equivalents, and alternatives falling within the spirit and scope of the present disclosure as defined by the appended claims.

DETAILED DESCRIPTION

Overview

The following terms are used throughout this document and are defined here for clarity and convenience.

Attachment refers to a physical electrical connection between a downstream device and an upstream port.

Connection refers to the state in which a downstream device is attached to an upstream port and the downstream device has pulled either $D_P$ (Data Plus) or $D_M$ (Data Minus) signals high through a resistor, in order to enter signaling.

Disconnect refers to the loss of active USB communication between a USB host and a USB device.

Legacy Device may be a USB device that requires application of non-BCS signatures on the $D_P$ and $D_M$ pins to enable charging.

Downstream Device is a USB device connected on the $D_P$ and $D_M$ pins of a host device and that acts as a slave to the host device.

Standard Downstream Port is a downstream port on a host or a hub. The port expects that a downstream device will draw less than 2.5 mA when unconnected, up to 100 mA when connected, and up to 500 mA if so configured and not suspended.

Charging Downstream Port (CDP) is a downstream port on a device that complies with the USB 2.0 definition of a host or a hub, except that a downstream device is permitted to draw in excess of 500 mA up to $I_{DCHG}$ while simultaneously communicating with a host device.

Dedicated Charging Port (DCP) refers to a downstream port on a device that outputs power through a USB connector, but is not capable of enumerating a downstream device. A dedicated charging port is required to allow a downstream device to draw at a minimum current of $I_{DCHG}$ at an average voltage of $V_{CHG}$.

DCD (Device Connection Detection) refers to an action taken by downstream devices, when $V_{BUS}$ is applied, to determine when the $D_P$ and $D_M$ pins are connected to a USB host.

Charger Emulation Profile refers to the reactive handshake applied on the $D_P$ and $D_M$ pins to emulate a specific charger type such as a BCS CDP or a legacy dedicated charger device.

USB Charger includes a device with a dedicated charging port, such as a wall adapter or a car power adapter.

Portable Device refers to any USB or on-the-go (OTG) device that is capable of operating from its own battery and is also capable of drawing current from its USB port for the purpose of operating and/or charging its battery.

Embodiments of the present disclosure provide a method and system for detecting and/or indicating attachment and removal for the portable device while charging with adjustable threshold voltages. Here, the battery charging system is equipped to digitize the current flowing through a switch such as a Bypass switch and may compare the voltage based on the current with a pre-defined threshold voltage which may be adjusted. Further, a user may set or adjust the pre-defined threshold voltage. Based on the comparison, the current may be flagged as attachment or removal for the portable device. Further, the battery charging system can set a value of an output flag attachment or removal bit for extremely low values of current.

Exemplary Embodiments

FIG. 1 is a block diagram illustrating an exemplary charging network 100, where various embodiments of the present disclosure may operate. The charging network 100 includes a portable device 102, a connector 104, a charging system 106, and a power supply 108. It will be understood that though embodiments of the present disclosure are described in terms of a USB system, the embodiments of this disclosure are not restricted to USB systems. The embodiments may just as easily be incorporated in any other charging system such as a conventional cell phone charger, or a notebook charger, without departing from the scope of the present disclosure.

The connector 104 can attach to the portable device 102 to the charging system 106. Examples of the portable device 102 may include, a mobile phone, a tablet computer, a personal digital assistant (PDA), and so forth. The portable device 102 can be any electronic or computing device that requires charging. The power supply 108 provides current to the charging system 106 and the portable device 102 (through the charging system 106). In an embodiment of the present disclosure, the connector 104 may be a USB connector which in turn includes one or more pins, such as a Voltage $V_{BUS}$ 110, a Data (plus) $D_P$ pin 112, a Data (minus) $D_M$ pin 114, and a Ground $G_{ND}$ pin 116. Data can be transferred to and from the portable device 102 through the data pins $D_P$ pin 112 and the $D_M$ pin 114. The power supply 108, providing current, can connect to the charging system 106 through the $V_{BUS}$ pin 110, and $G_{ND}$ pin 116 can connect the USB connector 104 to ground.

In an embodiment, the charging system 106 may be connected to a host, or, alternatively, the host, the charging system 106, and the connector 104 may be part of a host device, or they may be the host. Examples of the host or the host device may include, any computing device having its own battery power, such as a laptop or a tablet computer or a computing device connected to an external AC power supply 108 such as a personal computer, television, music player, and so forth. When the portable device 102 is connected to the host device, through the connector 104 and the charging system 106, it may begin to draw charging current. Moreover, the host device can function in multiple power modes such as full power, idle, sleep, hibernate, or shutdown mode. In each mode, the power consumed by the host device may vary. Consequently, the power supplied to the connected portable device 102 or the charging device may vary.

The charging system 106 may be a downstream USB port or a USB device. Moreover, the charging system 106 may be compatible with Battery Charging Specification 1.1 or 1.2. Alternatively, the charging system 106 may be compatible with non-Battery Charging Specification (BCS) compatible legacy devices, such as Apple® or Blackberry® portable devices. According to another embodiment of the present disclosure, the port may include an emulation circuit that may allow the port to emulate any known or configurable charging ports making the port compatible with any portable device 102 available.

The power supply 108 may be a part of the host, or it may be a separate unit directly supplying charge to the portable device 102. Alternatively, the power supply 108 may be a DC power source or an AC power source. If the power supply 108 is an AC power source, the host or the charging system 106 can convert the power into a DC power source before supplying it to other circuit elements.

Figure 2:
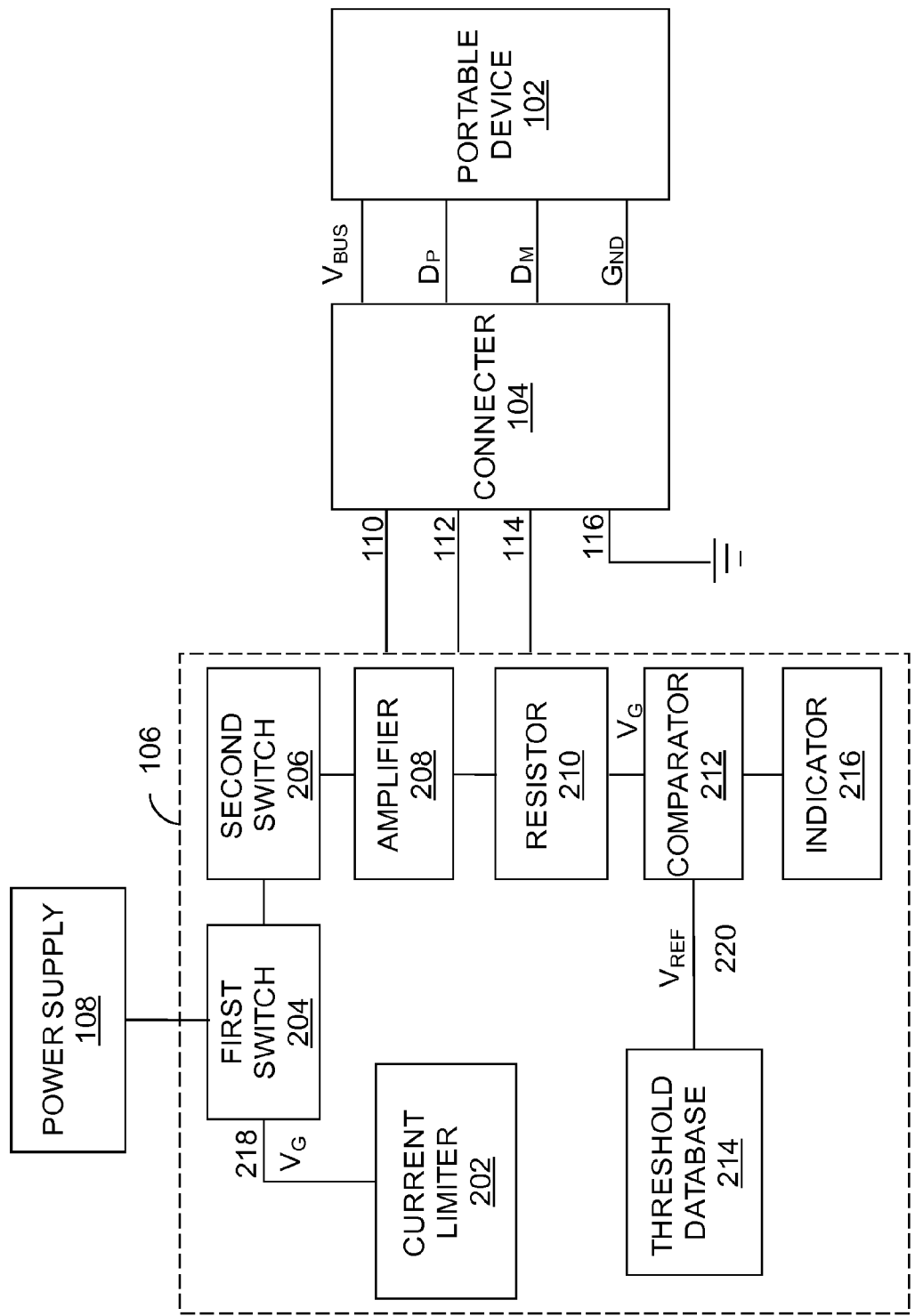
FIG. 2 illustrates structural components of an exemplary charging system, according to some embodiments of the present disclosure.

FIG. 2 illustrates structural components of an exemplary charging system, according to some embodiments of the present disclosure. As described previously, the portable device 102 may connect to the charging system 106 through the connector 104. Here, the charging system 106 may be a universal or smart charger that can efficiently charge a number of portable device types. The portable device 102 can draw power from the power supply 108. The charging system 106 includes a current limiter 202, a first switch 204, a second switch 206, an amplifier 208, a resistor 210, a comparator 212, a threshold database 214, and an indicator 216. The first switch 204 connects to the power supply 108. Further, after connection, the charging system 106 draws current from the power supply 108, and provides or delivers the charging current to the portable device 102 through the $V_{BUS}$ 110 pin. Further, the first switch 204 may connect data ports of the portable device 102 to the host through the $D_P$ pin 112 and $D_M$ pin 114. The current limiter 202 limits or adjusts the value of the current or voltage based on the current flowing through the charging system 106. Further, the first switch 204 or the charging system 106 delivers the limited current $V_G$ 218 to the portable device 102 based on the portable device 102.

The second switch 206, connected to the first switch 204, replicates a current flowing through the first switch 204. The current is replicated at the second switch 206 based on a pre-defined ratio. The pre-defined ratio may be a ratio of current of the first switch 204 to the current of the second switch 206. Further, the pre-defined ratio may be set by the user. For example, if the current drawn at the first switch 204 is 100 uA and the pre-defined ratio is 2:1, then a current of 50 uA is replicated at the second switch 206. Further, the first switch 204 is the bypass switch and the second switch 206 is the replica switch. The bypass switch can be a hardware device which may provide a fail-proof access port to the connected portable device 102 or monitoring devices. Further, the bypass switch may monitor the status of the link between its ports and the in-line devices which are being monitored.

Figure 4:
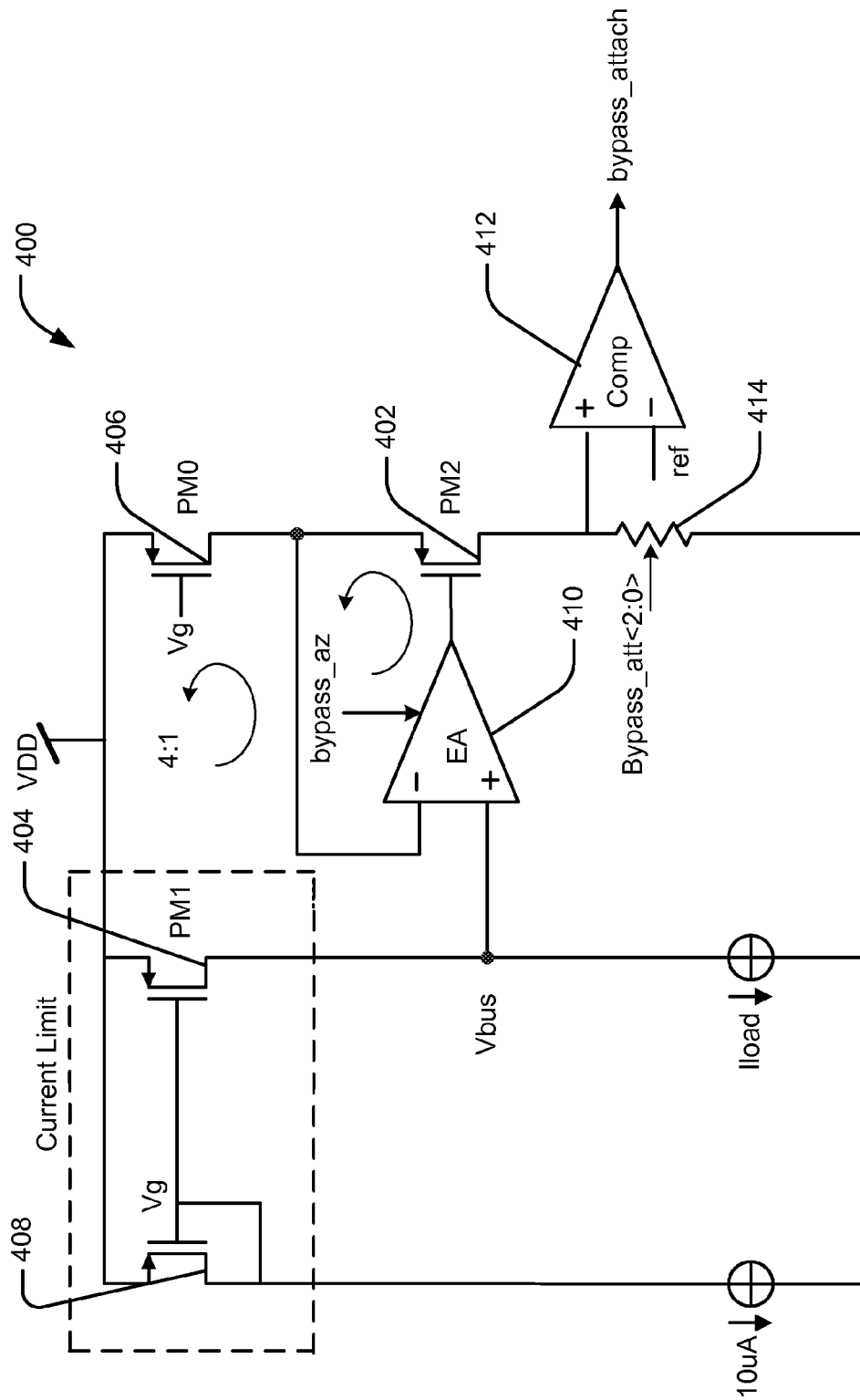
FIG. 4 is a circuit diagram illustrating an exemplary charging network 400, where various embodiments of the present disclosure may operate.

The amplifier 208 is connected to the second switch 206. Further, the amplifier 208 drives the current flowing through the first switch 204 into the second switch 206 based on the pre-defined ratio. Examples of the pre-defined ratio may include 2:1, 1:1, 4:1, and so forth. Further, the amplifier 208 maintains the current flowing through the second switch 206 as long as it is not current limited. In one embodiment, assuming the first switch 204 and the second switch 206 to be PMOS switches, the amplifier 208 forces the voltage $V_{DS}$ of the second switch 206 to be the same as the voltage $V_{DS}$ of the first switch 204 by virtue of negative feedback. One example of this concept is shown in FIG. 4.

The resistor 210 generates a voltage based on the current flowing through the second switch 206. In an embodiment of the system, the resistor 210 generates a voltage based on the current flowing through the charging system 106. The current flowing through this resistor generates a voltage $V_G$ 218, which is then, is compared with a threshold voltage $V_{REF}$ 220 by the comparator 212. The threshold database 214 stores one or more threshold voltage such as $V_{REF}$ 220. The one or more threshold voltages may be stored in a relational fashion in the threshold database 214. For example, the threshold database 214 is part of a relational database. Further, the threshold database 214 stores one or more threshold values for the particular port or type of the portable device 102. For example, a BCS 1.1 compatible charging system may store typical charging current values for BCS 1.1 compatible portable devices.

Further, the user may set the one or more threshold voltages or the voltage $V_{REF}$ for attachment or removal detection. Further, the threshold voltage $V_{REF}$ 220 may be adjusted or modified by the user for attachment or removal detection. Further, the threshold voltage $V_{REF}$ 220 may be set based on the threshold value of current for the portable device 102. Subsequently, the indicator 216 indicates an attachment or removal for the portable device 102 based on the result of the comparison. For example, if the value of the voltage based on the current drawn by the portable device 102 is less than the threshold voltage $V_{REF}$ 220, then a removal for the portable device 102 may be indicated, and if the voltage based on the current is equal to or more than the threshold voltage $V_{REF}$ 220, then attachment may be indicated. In an embodiment, the indicator 216 may indicate the attachment or removal through an alert.

Further, the indicator 216 may sets a value of an output flag or bit based on the comparison. The value of the output flag or bit may be set as attachment or removal. In an embodiment, the output flag of the comparator 212 may be flagged or set as attachment or removal appropriately based on the current supplied to the $V_{BUS}$ 110. For example, if the threshold current for removal of the portable device 102 is set to 200 uA,
then the threshold voltage $V_{REF}$ 220 is changed to 200 mV through a selectable multiplexer. If a current of 210 uA is being drawn by the portable device 102 through the $V_{BUS}$ and a ratio of 4:1 is used for the size of the first switch 204 (or the bypass switch) to the second switch 206 (or replica bypass switch), then the current flowing through the second switch 206 would be 52.5 uA. Then the resistor 210 may generate a voltage based on this value of the current. In this case the voltage would be 210 mV. This may cause the indicator 216 to trip flagging to 'attach'. Similarly, any voltage below 200 mV may be flagged as removal.

In an embodiment, when the voltage based on the current drawn by the portable device 102 or current flowing in the charging system 106 is lower than the threshold voltage $V_{REF}$ 220, the charging system 106 may make certain system-level decisions. Examples of the one or more system level decisions may include emitting the alerting signals, resetting the portable device 102, discontinuing the charging of the portable device 102, alerting the portable device 102, continuing the charging of the portable device 102, and so forth. If, on the other hand, the voltage of the charging current is above the threshold voltage $V_{REF}$ 220, then the charging system 106 may simply carry on charging the portable device 102 without any intervention.

The charging system 106 may further include a circuitry to detect or sense the current. In one embodiment of the present disclosure, this circuitry to detect current may be implemented within the power switch 108. Alternatively, the charging system 106 may include the circuitry that is not part of the power switch 108, but connected to it. It will be understood that any other circuitry or additional circuitry may just as easily be used to detect the current. Further, the charging system 106 may include a digital signal converter for digitizing the current drawn from the power supply 108.

Further, the comparator 212 is implemented in digital or analog. In the digital implementation, the digital value of the current (output from an internal or external ADC) is compared with a digital threshold value. In the analog implementation, the comparator 212 is connected to the output of the resistor 210. In this scenario, the digital threshold value in the threshold database 214 may be converted to analog and applied to the second input of the comparator 212. It will be understood that the circuit description of the comparator 212 is merely exemplary and any other suitable circuit elements may be employed without departing from the scope of the present disclosure.

Further, the portable device 102 may have multiple charging profiles such as, but not limited to, BCS Charging Port Detection Protocol (Charging Downstream Port, Dedicated Charging Port, and Standard Downstream Port), RIM® handshake profile, Apple® handshake profile, and multiple other configurable profiles. For example, the configurable profiles may be utilized to charge certain portable devices that are not compatible with the BCS profile, such as certain handsets manufactured by small entities in China. Further, the charging system 106 may include a database to store one or more charging profiles of the portable device 102. Each profile in the database may include information such as, but are not limited to, profile name, profile type, handshake signals used, magnitude of the signals, threshold values, one or more timers, and threshold charging current values.

Figure 3:
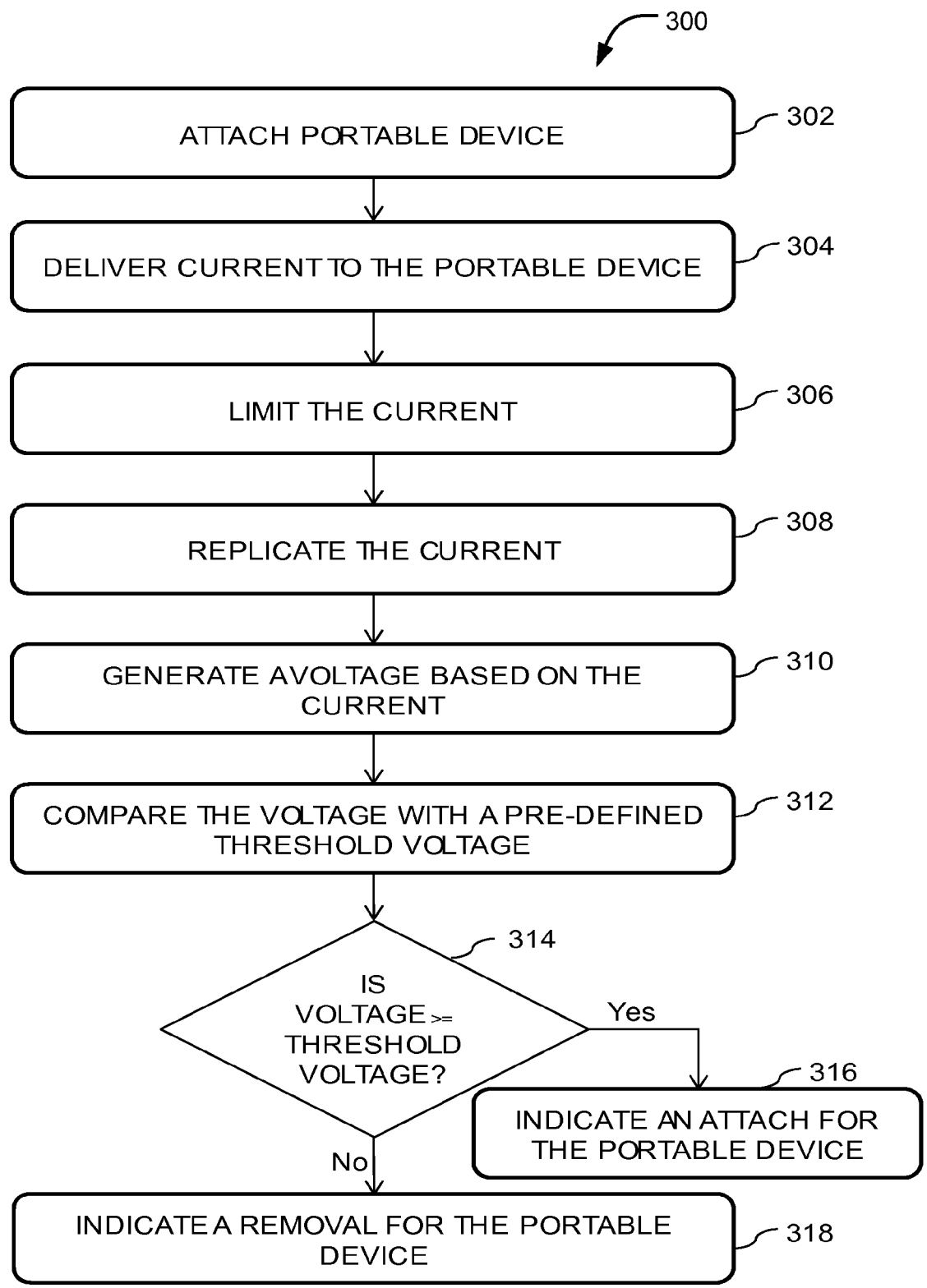
FIG. 3 is a flowchart depicting an exemplary method for indicating attachment and removal for a portable device.

FIG. 3 is a flowchart depicting an exemplary method for indicating attachment and removal for the portable device 102. The method 300 illustrated in FIG. 3 may be used in conjunction with any of the systems or devices shown in the previously described figures, among other devices. In various embodiments, some of the method elements shown may be performed concurrently, in a different order than shown, or may be omitted. Additional method elements may be performed as desired. As shown, the method 300 may operate as follows.

At step 302, the portable device 102 is attached to a charging port, such as the charging system 106. Next, at step 304, the charging system 106 delivers current to the portable device 102. As discussed with reference to FIG. 2, the first switch 204 draws the current from the power supply 108 and delivers it to the portable device 102. Further, the charging system 106 detects the current drawn from the power supply 108. Alternatively, the charging system 106 detects the current available on the $V_{BUS}$ 110 pin. As described previously, various current sensing or detecting techniques may be utilized here without departing from the scope of the present disclosure. For example, a current sensing resistor may be utilized. If the current is detected from the power supply 108, the portable device 102 begins charging from the power supply 108. Else, the charging system 106 generates an alert informing the user that the portable device 102 has not been connected properly. Further, a digital signal converter of the charging system 106 digitizes the current drawn from the power supply 108.

At step 306, the charging system 106 limits the current (or the digital current) drawn from the power supply 108 if the current drawn by the portable device exceeds the short circuit current limit. In an embodiment, the current limiter 202 limits the current flowing through the charging system 106. Further, the current may be limited based on the portable device 102. Next, at step 308, the charging system 106 replicates the current at the second switch 206. The amplifier 208 drives or replicates the current flowing through the first switch 204 at the second switch 206. In an embodiment, the current may be replicated based on a pre-defined ratio which may be set by the user. In an exemplary scenario, when a current of 200 uA is drawn through the first switch 204 and ratio of 2:1 is used, a current of 100 uA may be replicated at the second switch 206.

Then, at step 310, the charging system 106 generates a voltage based on the current flowing through the system. In an embodiment, the resistor 210 generates a voltage based on the current flowing through the second switch 206. For example, when a current of 210 uA is flowing through the second switch 206 then the resistor 210 generates a voltage of 210 mV. At step 312, the charging system 106 compares the generated voltage based on the current with the threshold voltage $V_{REF}$ 220 stored in the threshold database 214. In an embodiment, the comparator 212 compares the generated voltage or $V_G$ 218 with the threshold voltage $V_{REF}$ 220. The current may be converted into a digital value before comparing when a digital comparator is utilized. Otherwise, the stored threshold value may be converted into an analog signal. Then, the analog current signal and the threshold voltage $V_{REF}$ 220 may be compared in an analog comparator.

Thereafter, at step 314, the charging system 106 determines whether the generated voltage or $V_G$ 218 is greater than or equal to the threshold voltage $V_{REF}$ 220. If the generated voltage or $V_G$ 218 is greater than or equal to the threshold voltage $V_{REF}$ 220 (yes path from step 314), then the charging system 106 indicates attachment for the portable device 102 at step 316. When at step 314, the generated voltage or $V_G$ 218 is lower than the threshold voltage $V_{REF}$ 220; the charging system 106 indicates a removal for the portable device 102 at the step 318. In an embodiment, the charging system 106 indicates a removal of the portable device 102 by raising an alert and/or disconnecting the portable device 102. Further, the charging system 106 may reset the connection between the portable device 102 and itself. In an embodiment, the indicator 216 may indicate attachment or removal for the portable device 102 based on the comparison result. In an embodiment, the indicator 216 sets a value of an output flag to indicate an attachment or removal for the portable device 102 based on the comparison result. For example, when the threshold voltage is 200 mV, then if the generated voltage is 110 mV, then the value of the output flag may be set to indicate removal for the portable device 102. These steps increase the efficiency and utility of a charging port by allowing the port to detect and indicated attachment and removal for the portable device 102 with adjustable threshold voltages. The user may reset or adjust the threshold voltages a stored in the threshold database 214.

The methods and systems discussed in the present disclosure provide techniques to charge legacy and non-legacy devices in an efficient manner. An advantage of the disclosed techniques is to minimize value of quiescent current flowing through the system. The quiescent current is the current, which continues to draw from the charging system 106 or the host device when the application or device (here the portable device 102) it powers is in standby mode. Further, the disclosed methods and systems may be used to accurately and reliably detect attachment and removal for very low values of the current. Further, the disclosed system may detect the attachment and removal with adjustable threshold voltages.

Those in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the present disclosure, which is determined solely by reference to the appended claims.

FIG. 4 is a circuit diagram illustrating an exemplary charging network 400, where various embodiments of the present disclosure may operate. The charging network 400 can be connected or attached to a portable device 402 at PM2. The charging network 400 includes a bypass switch 404 or M15 connected to a replica switch 406 or M8. The bypass switch 404 connects to a power supply and after connection; current starts flowing in the charging network 400, and is delivered to the portable device 402 through the $V_{BUS}$ 110. Further, the charging network 400 includes a current limiting device 408, which limits or adjusts the value of the current or voltage based on the current flowing through the charging network 106. Further, the first switch 204 or the charging system 106 delivers the limited current $V_g$ to the portable device based on the type of the portable device.

The replica switch 406 (M8), connected to the bypass switch 404 (M15), replicates a current flowing through the bypass switch 404. The current is replicated at the replica switch 406 (M8) based on a pre-defined ratio. The pre-defined ratio may be a ratio of current of the bypass switch 404 (M15), to the current of the replica switch 406 (M8). Further, the pre-defined ratio may be set by the user. For example, if the current drawn at the first switch 204 is 100 uA and the pre-defined ratio is 2:1, then a current of 50 uA is replicated at the second switch 206. The bypass switch 404 can be a hardware device which may provide a fail-proof access port to the connected portable device 102 or monitoring devices. Further, the bypass switch 404 and the replica switch 406 monitors the status of the link between its ports and the in-line devices which are being monitored.

Further, the charging network 400 includes an amplifier 410 connected to the replica switch 406 (M8). The amplifier 208 drives current flowing through the bypass switch 404 (M15) into the replica switch 406 (M8) based on the pre-defined ratio. Examples of the pre-defined ratio may include 2:1, 1:1, 4:1, and so forth. The amplifier 410 also maintains the current flowing through the replica switch 406 as long as its current limited. In one embodiment, assuming the bypass switch 404 and the replica switch 406 are PMOS switches, the amplifier 410 forces the voltage of the current ($V_{DS}$) of the replica switch 406 to be the same as the voltage based on the current of the bypass switch by virtue of negative feedback.

The charging network 400 further includes a resistor 414 for generating a voltage based on the current flowing through the charging network 400. During the normal mode of operation when an Iload is applied on $V_{bus}$, the bypass switch 404 start delivering required current from $V_{DD}$. The copy value of the current drawn from the bypass switch 404 (M15) is then forced through the replica switch 406 (M8). This is done by an auto zeroed error amplifier "EA" which forces the $V_{DS}$ on the replica switch M8 to be the same as that of the bypass switch 404 (M15). The auto-zeroed amplifier 410 drives the portable device 402 (PM2) to remain in saturation and forces the source of the device 402 (PM2) to $V_{bus}$ voltage by virtue of negative feedback. The copy current flowing through the replica switch 406 (M8) is then impressed on the resistor 414 to generate a voltage "$V_{gen}$". A comparator 412 then compares this voltage with the reference voltage "ref" which has a selectable threshold voltage based on the attachment/removal detection threshold. The comparator 412 output "bypass attach" is flagged as attach/removal appropriately based on the Iload on $V_{bus}$. For example, if the threshold for attachment is set to 200 uA, then threshold voltage for the ref signal is changed to 200 mV through a selectable multiplexer. If a Iload of 210 uA is being drawn through the $V_{bus}$ and a ratio of 4:1 is used for the size of the bypass switch 404 to the replica switch 406, then the current flowing through the replica switch 406 would be 52.5 uA. This current after being impressed upon the resistor 414 generates a voltage of 210 mV flagged as removal. The solution also has two feedback loops as shown in FIG. 4, which need to be stabilized for proper operation.

What is claimed is:

1. A battery charging system for indicating attachment and removal for a portable device, the system comprising:
   a first switch for connecting the portable device to a power supply;
   a second switch connected to the first switch for replicating a current flowing through the first switch;
   a resistor connected to the amplifier for generating a voltage based on the current flowing through the second switch;
   a comparator connected to the resistor for comparing the voltage with a pre-defined threshold voltage; and
   an indicator for indicating at least one of attachment or removal for the portable device based on the comparison.

2. The battery charging system of claim 1, wherein the charging system further comprises an amplifier connected to the second switch for:
   driving the current flowing through the first switch into the second switch; and
   supplying the current to the portable device within a pre-defined range.

3. The battery charging system of claim 1, wherein the charging system further comprises a current limiter for limiting the current flowing through the charging system.

4. The battery charging system of claim 1, wherein the indicator is further configured to set a value of an output flag based on the comparison, wherein the value of the output flag comprises at least one of attachment or removal.

5. The battery charging system of claim 1, wherein the charging system is configured to make one or more system level decisions regarding charging of the portable device when the voltage based on the current is below the pre-defined threshold voltage.

6. The battery charging system of claim 5, wherein the one or more system level decisions comprising at least one of:
   resetting the portable device;
   discontinuing the charging of the portable device;
   alerting the portable device; or
   continuing charging of the portable device.

7. The battery charging system of claim 1, wherein the charging system further comprises a threshold database for storing one or more threshold voltages, wherein the one or more threshold voltages are set by the user for attachment or removal detection.

8. The battery charging system of claim 1, wherein the pre-defined threshold voltage is adjustable.

9. The battery charging system of claim 1, wherein the charging system is a universal serial port (USB) charging port.

10. The battery charging system of claim 1, wherein the charging system further comprises a digital signal converter for digitizing the current flowing through the charging system.

11. The battery charging system of claim 1, wherein the comparator is a digital module.

12. The battery charging system of claim 1, wherein the comparator is an analog circuit.

13. A method for indicating attachment and removal for a portable device, the method comprising:
   attaching the portable device to a charging system;
   delivering current to the portable device from the charging system, wherein the delivered current is limited based on the portable device;
   replicating the current flowing through a first switch at a second switch;
   generating a voltage based on the current flowing through the second switch;
   comparing the voltage with a pre-defined threshold voltage; and
   indicating at least one of attachment or removal for the portable device based on the comparison.

14. The method of claim 13 further comprising:
   driving the current flowing through the first switch into the second switch; and
   supplying the current to the portable device within a pre-defined range.

15. The method of claim 13 further comprising limiting the current flowing through the charging system.

16. The method of claim 13 further comprising setting a value of an output flag based on the comparison, wherein the value of the output flag comprises at least one of attachment or removal.

17. The method of claim 13 further comprising making one or more system level decisions regarding charging of the portable device when the voltage based on the current is below the pre-defined threshold voltage, further wherein the pre-defined threshold voltage is set by the user for attachment or removal detection.

18. The method of claim 17, wherein making the one or more system level decisions further comprises at least one of:
  resetting the portable device;
  stopping the charging of the portable device;
  alerting the portable device; or
  continuing charging of the portable device.

19. The method of claim 17, wherein the pre-defined voltage is stored in a threshold database, further wherein the pre-defined voltage is adjustable.

20. The method of claim 13 further comprising digitizing the current flowing through the charging system.

\* \* \* \* \*